July 11, 1944.                S. H. BEACH                    2,353,539
                         ARTICLE GRADING DEVICE
                          Filed May 22, 1943              2 Sheets-Sheet 1
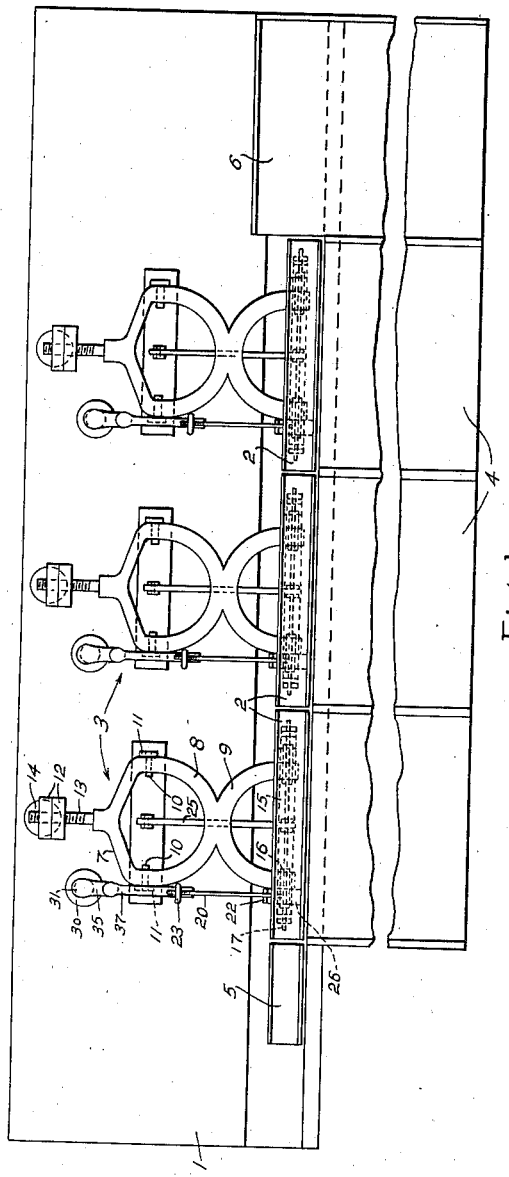
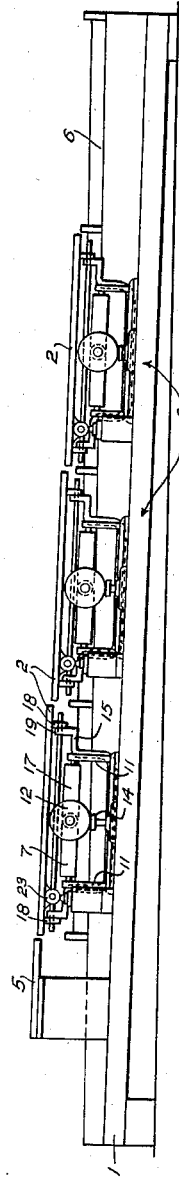
Inventor:
Stewart H. Beach.
By Alex. E. MacRae
Attorney.

July 11, 1944.  S. H. BEACH  2,353,539
ARTICLE GRADING DEVICE
Filed May 22, 1943  2 Sheets-Sheet 2

Inventor:
Stewart H. Beach
Attorney.

Patented July 11, 1944

2,353,539

UNITED STATES PATENT OFFICE 2,353,539

ARTICLE GRADING DEVICE

Stewart Howard Beach, Iroquois, Ontario, Canada

Application May 22, 1943, Serial No. 488,037
In Canada May 11, 1943

2 Claims. (Cl. 209—121)

This invention relates to a device for grading eggs or like articles by weight.

Many devices have been proposed for this purpose but the majority are subject to various disadvantages. Some are of complicated nature involving costly manufacture; others do not possess sufficient sensitivity to provide accurate grading; still others result in injury to the articles being handled, particularly fragile articles such as eggs.

It is an object of this invention to provide a machine of simple construction having accurate, sensitive and efficient means for grading articles. A specific object is to provide, in such a machine having a plurality of weighing devices, separate means, associated with each weighing device and responsive to relatively slight movement thereof under the influence of an article of a specific weight range, for quickly and gently discharging such article, and whereby the weighing device rapidly returns to its normal position.

Figure 3:
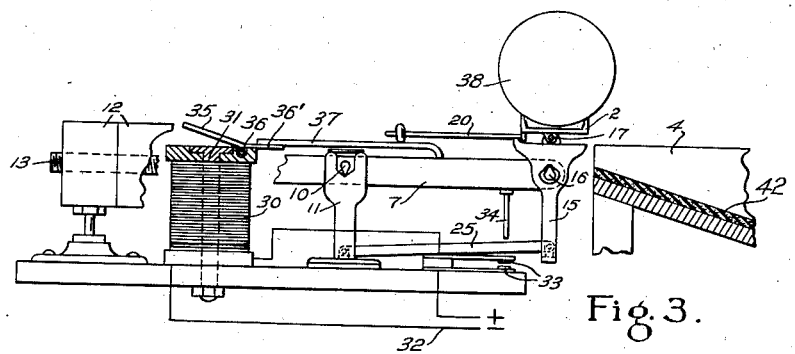
Figure 4:
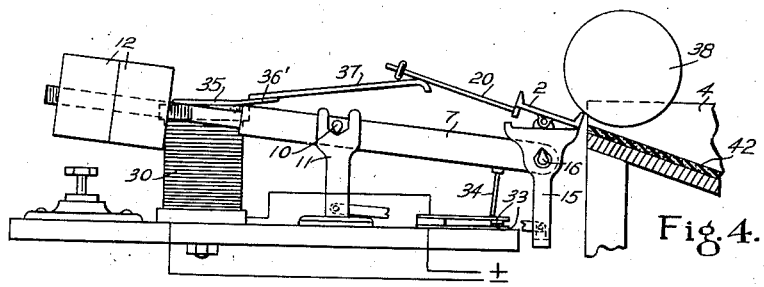
Figure 5:
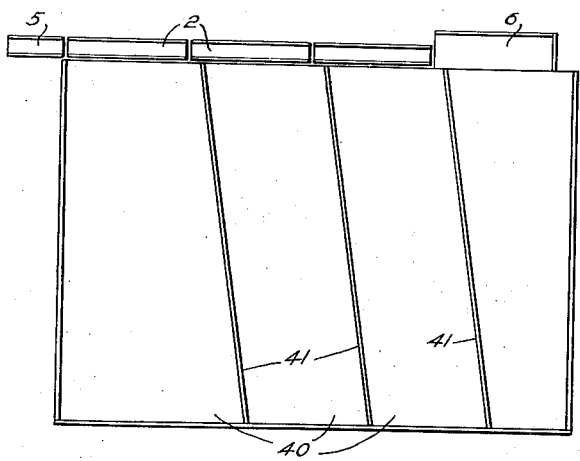

Further objects, advantages and details will become apparent from the following description of the invention with particular reference to the accompanying drawings, in which Figure 1 is a plan view of a machine constructed in accordance with the invention, Figure 2 is a side elevation, Figure 3 is an enlarged view in side elevation of one of the grading units, Figure 4 is a side elevation partly in section of the grading unit in article-discharging position, and Figure 5 is a plan view of a modified form of article-receiving compartment.

In the drawings the device is shown as mounted upon an inclined base 1 and comprising an egg or other article runway 2 formed in three parts, each of which constitutes a tiltable article-receiving platform or scale pan for a corresponding weighing device 3 and each of which is adapted to discharge eggs of a definite weight range into a receiving tray 4. At the upper end of the runway is mounted a fixed portion 5 on which the articles to be graded are to be placed. A tray 6 is arranged at the lower end of the runway to receive eggs discharged over the end thereof.

Each weighing device 3 includes a balance arm 7 having two forked portions 8 and 9, the portion 8 carrying a pair of bearing pivots 10 supported on uprights 11, which provide a fulcrum for the balance arm. Adjustable weights consisting of a pair of jam nuts 12 are mounted on a rod 13 carried at one end of the balance arm and an adjustable weight rest 14 may be provided therefor. A substantially U-shaped member 15 is pivotally suspended by means of bearing pivots 16 from the forked portion 9 at the other end of the balance arm. A pivotally mounted link 25 maintains the member 15 in vertical position during up and down movements thereof.

Means are associated with each grading unit for laterally discharging an article of such weight that it causes downward movement of the respective end of balance arm 7, such means being adapted to tilt the scale pan 2 on a relatively slight degree of such downward movement. The scale pan 2 is pivotally mounted on the member 15 by means of a pin 17 which engages a pair of lugs 18 on the scale pan and a pair of lugs 18 on the member 15. The pin 17 is mounted off center with respect to the scale pan 2, as shown in Figure 3, and the resultant normal tendency of the scale pan to tilt to the right when an article is placed thereon is overcome by means of a weight arm 20, one end of which is secured to a lug 21 on the scale pan. The weight arm 20, with the device in normal position as shown in Figure 3, is fulcrumed on an upturned projection 22 formed on the member 15 and carries at its outer end an adjustable weight 23. An electromagnet 30 having a core 31, fed by a suitable electric circuit 32, is mounted on the base 1 adjacent each grading unit. Means for opening and closing the circuit include a pair of normally separated contacts 33 in the circuit, and a rod 34 carried by the balance arm 7 and adapted to engage and close the contacts on slight downward movement of the balance arm. Mounted on the electromagnet for cooperation with the end of core 31 is an arm 35 having a hinged connection 36 therewith. The arm 35 has an angular extension 36' which carries a bar 37. The bar 37 has engagement with the under surface of weight arm 20. It will be observed that, with the parts of the device in normal position, as shown in Figure 3, the circuit 32 is open and the arm 35 is inclined away from the end of the core 31 of the magnet. When the balance arm 7 moves downwardly under the weight of an article, indicated at 38, the contacts 33 are pressed together to close the circuit 32. The electromagnet is then energized and attracts the arm 35 to move it downwardly into contact with the end of the core, as shown in Figure 5. Such movement of the arm swings the bar 37 upwardly to tilt the weight arm 20 and scale pan 2, thus discharging the article into the adjacent tray 4, as shown. On discharge of the article, the balance arm 7 moves upwardly to break the contacts 33. The resultant de-energization of the electromagnet permits the parts to return to their normal position, as shown in Figure 3.

It will be observed that the off-center pivot of the scale pan 2 will cause the same to tilt at a greater angle and thus hasten the discharge of articles therefrom.

A projection 26 formed on the member 15, as shown, or on the scale pan, limits tilting movement of the scale pan.

The runway is preferably formed from a channelled metal strip of suitable dimensions whereby the eggs engage only the edges of the side portions thereof, as shown in Figure 3, to provide minimum frictional contact. Thus, only a slight inclination of the runway is necessary in order to ensure movement of the eggs therealong by gravity.

The operation of the device will be apparent from the foregoing description. Necessary adjustments are made to the three weighing devices corresponding with the customary three grades of eggs. The eggs are successively fed onto the fixed portion 5 of the runway and they move down the same by gravity. The first weighing device is adapted to discharge the heaviest articles into the first tray. Articles below a predetermined weight continue on to the second or third scale pan, which also discharge articles above predetermined weights. Very small articles of a weight insufficient to actuate the last weighing device are deposited in the tray 6.

As shown in Figure 2, the upper end of each scale pan or portion of the runway is slightly lower than the adjacent end of the adjoining portion. Thus, an article of a weight sufficient to effect a slight downward movement of the scale pan but insufficient to tilt the same will not be obstructed in its movement from one scale pan to the next.

Figure 5 illustrates a preferred construction of the egg or article receiving compartment. Such compartment comprises a series of trays 40 adjoining the scale pans 2. The partition walls 41 in the compartment which form the trays extend from a point a slight distance, say one inch, beyond the end of the corresponding scale pan, and in a direction inclined away therefrom. Such an arrangement precludes the possibility of an article being accidentally deposited in the wrong tray when, for instance, it is discharged at a point closely adjacent the lower end of the scale pan. Moreover, the inclined nature of the partition walls guards against injury to articles coming into contact therewith.

The tray side and bottom walls may be lined with a resilient material, such as sponge rubber 42, to guard further against injury to the articles.

The construction and mounting of the balance arm 7, as described, provides a highly sensitive and accurate weighing and grading means for the articles. The provision of specific discharge means for the graded article not only contributes to the sensitivity and accuracy of the machine's operation but it constitutes a means for depositing the graded articles in a gentle and non-injurious manner.

The capacity of the device is, of course, somewhat dependent upon the operator but it is capable of grading two hundred or more dozens of eggs per hour. It will be apparent that the number of grading units in the device is capable of wide variation depending upon the classification desired.

Various changes in structural details may be made without departing from the spirit and scope of the invention as defined in the appended claims.

I claim:

1. In an article grading device, a balance arm having a weight at one end and a member pivotally supported on the other end, an article receiving platform pivotally mounted on said member, a weight arm fixed to said platform and normally restraining the same from pivotal movement, means for engaging said weight arm to tilt said platform about its pivot, electromagnetic means for actuating said last-mentioned means, a circuit for energizing said electromagnetic means, and means responsive to movement of said balance arm for closing and opening said circuit.

2. In an article grading device, a balance arm having a weight at one end and a member pivotally supported on the other end, an article receiving platform pivotally mounted on said member, means normally restraining said platform from pivotal movement when an article is placed thereon, means for overcoming said restraining means to tilt said platform about its pivot and discharge an article therefrom, electrical means for actuating said last-mentioned means, a circuit for energizing said electrical means, and means responsive to movement of said balance arm for closing and opening said circuit.

STEWART HOWARD BEACH.